US 7,076,682 B2

(12) United States Patent
Jacobson

(10) Patent No.: US 7,076,682 B2
(45) Date of Patent: Jul. 11, 2006

(54) SYNCHRONOUS PIPELINE WITH NORMALLY TRANSPARENT PIPELINE STAGES

(75) Inventor: Hans M. Jacobson, White Plains, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 10/838,621

(22) Filed: May 4, 2004

(65) Prior Publication Data

US 2005/0251699 A1    Nov. 10, 2005

(51) Int. Cl.
G06F 1/04   (2006.01)
(52) U.S. Cl. ....................... 713/600; 712/219; 713/323
(58) Field of Classification Search ................ 712/219; 713/323
See application file for complete search history.

(56) References Cited

U.S. PATENT DOCUMENTS 6,393,579 B1 *  5/2002  Piazza ........................ 713/600
6,609,209 B1 *  8/2003  Tiwari et al. ................ 713/322

OTHER PUBLICATIONS

Hans Jacobson et al., "Stretching the Limits of Clock-Gating Efficiency in Server-Class Processors",Proceedings of the 11th International Symposium on High-Performance Computer Architecture (HPCA-Nov. 2005), Feb. 2005.*
Hans M. Jacobson, "Improved Clock-Gating through Transparent Pipelining", Proceedings of the 2004 International Symposium on Low Power Electronics and Design (ISLPED'04), Aug. 2004.*
Efthymiou et al., Adaptive Pipeline Depth Control for Processor Power Management, , Publisher: IEEE.
Shimada et al., Pipeline Stage Unification: A Low-Energy Consumption Technique for Future Mobile Processors, Aug. 23, 2003, pp. 326-329, Publisher: ACM, Published in: Seoul Korea.
Koppanalil et al., A Case for Dynamic Pipeline Scaling, Oct. 8, 2002, Publisher: ACM, Published in: Grenoble, France.

* cited by examiner

Primary Examiner—Thomas Lee
Assistant Examiner—Albert Wang
(74) Attorney, Agent, or Firm—Law Office of Charles W. Peterson, Jr.; Louis J. Percello, Esq.; Satheesh K. Karra, Esq.

(57) ABSTRACT

A synchronous pipeline segment and an integrated circuit (IC) including the segment. The segment includes an input stage, an output stage and at least one intermediate stage. A place holder latch associated with each stage indicates whether valid stage data is in the stage. A local clock buffer provides a local clock gating a corresponding stage. The input and output stages are normally opaque and intermediate stages are normally transparent. Data items pass locally asynchronously between the input and output stages and are separated by opaque gated intermediate stages.

37 Claims, 11 Drawing Sheets

CLOCK CYCLE 3

CLOCK CYCLE 4

CLOCK CYCLE 5

SYNCHRONOUS PIPELINE WITH NORMALLY TRANSPARENT PIPELINE STAGES

CROSS REFERENCE TO RELATED APPLICATION

The present invention is related to U.S. application Ser. No. 10/262,769 entitled "INTERLOCKED SYNCHRONOUS PIPELINE CLOCK GATING" to Hans M. Jacobson et al., filed Oct. 2, 2002, and assigned to the assignee of the present invention.

BACKGROUND OF THE INVENTION

1. Field of the Invention

The present invention generally relates to synchronous integrated circuits and more particularly to reducing power consumption in a synchronous pipeline circuit.

2. Background Description

Semiconductor technology and chip manufacturing advances have resulted in a steady increase of on-chip clock frequencies, the number of transistors on a single chip and the die size itself accompanied by a corresponding decrease in chip supply voltage. Generally, the power consumed by a given clocked unit (e.g., latch, register, register file, functional unit and etc.) increases linearly with the frequency of switching within the unit. Thus, not withstanding the decrease of chip supply voltage, chip power consumption has increased as well.

Chip and system level cooling and packaging costs have escalated as a natural result of this increase in chip power. It is crucial for low end systems (e.g., handhelds, portable and mobile systems) to reduce net energy consumption to extend battery life but, without degrading performance to unacceptable levels. In current microprocessor designs, over 70% of the power consumed is attributable to the clock alone. In a typical synchronous design, over 90% of this power is consumed in local clock splitters/drivers and latches.

Basically, a synchronous design includes multiple register stages in what is commonly referred to as a pipeline. A register stage or latch is normally referred to as transparent, when the it instantaneously passes data value at its input to its output; the same stage or latch is normally referred to as opaque when data is latched in it, i.e., the opaque latch is holding its output constant, regardless of its input such that its input is not passed to its output. Thus, in a typical pipeline based on master/slave latches, clocked by an ungated clock, stages are normally opaque and alternate stages are pulsed transparent in alternate clock states, e.g., even stages held opaque and odd stages pulsed transparent when the clock is high and vice versa when the clock is low. Clock gating, selectively turning the clock on and off, has been used to reduce power dissipation in synchronous designs such as microprocessors. While master and slave latches are really separate latch stages of a pipeline, they are typically collectively referred to paired as a stage.

A simple example of a pipeline is a first-in first-out (FIFO) register. In a more complicated pipeline example, logic may separate some or all of the stages, e.g., a Multiply/Add-Accumulate (MAAC) unit or other state of the art pipeline microprocessors functional unit. A FIFO is an M stage by N bit register file with each of M stages including an N latch register, at least one latch for each data bit. Normally, all of the stages are simultaneously clocked by a single global clock, passing data items from one stage to the next with each clock. An N-bit data item from an input environment enters a first stage on one clock cycle and, substantially the same N-bit word exits the last stage unchanged at an output environment M clock cycles later. Thus, a FIFO may be used as an M-clock cycle delay. On each clock cycle (e.g., every other rising or falling clock edge) each N-bit word in the FIFO advances one stage. Without clock gating every FIFO stage is clocked at every cycle. With coarse clock gating, the clock may be gated off when the FIFO is empty to reduce/eliminate FIFO power consumption during that time. With finer grained clock gating, individual FIFO stages may be gated off when valid data is not in the particular stage, e.g., to save power even when the FIFO is not empty.

Fine grained clock gating techniques selectively stop functional unit clocks by selectively gating local clocks off within functional blocks, e.g., to stages within the pipeline. See, e.g., U.S. application Ser. No. 10/262,769 entitled "INTERLOCKED SYNCHRONOUS PIPELINE CLOCK GATING" to Hans M. Jacobson et al., filed Oct. 2, 2002, and assigned to the assignee of the present invention and incorporated herein by reference. While these clock gating techniques can reduce the number of clock pulses generated in the pipeline, the local clock is still pulsed for each stage, at least once for each data item propagating through the pipeline, to minimize the risk of data races through the latches of adjacent pipeline stages.

Thus, there exists a need for dynamically selected latch stage clocking for synchronous pipelines that adapts to the current state of the pipeline, on a cycle-by-cycle basis, without reducing the operation frequency of the pipeline.

SUMMARY OF THE INVENTION

It is a purpose of the invention to minimize clock power in synchronous designs;

It is another purpose of the invention to increase clock gating flexibility;

It is yet another purpose of the invention to minimize synchronous design power without reducing pipeline operating frequency.

The present invention relates to a synchronous pipeline segment and an integrated circuit (IC) including the segment. The segment includes an input stage, an output stage and at least one intermediate stage. A place holder latch associated with each stage indicates whether valid stage data is in the stage. A local clock buffer provides a local clock gating a corresponding stage. The input and output stages are normally opaque and intermediate stages are normally transparent. Data items pass locally asynchronously between the input and output stages and are separated by opaque gated intermediate stages.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
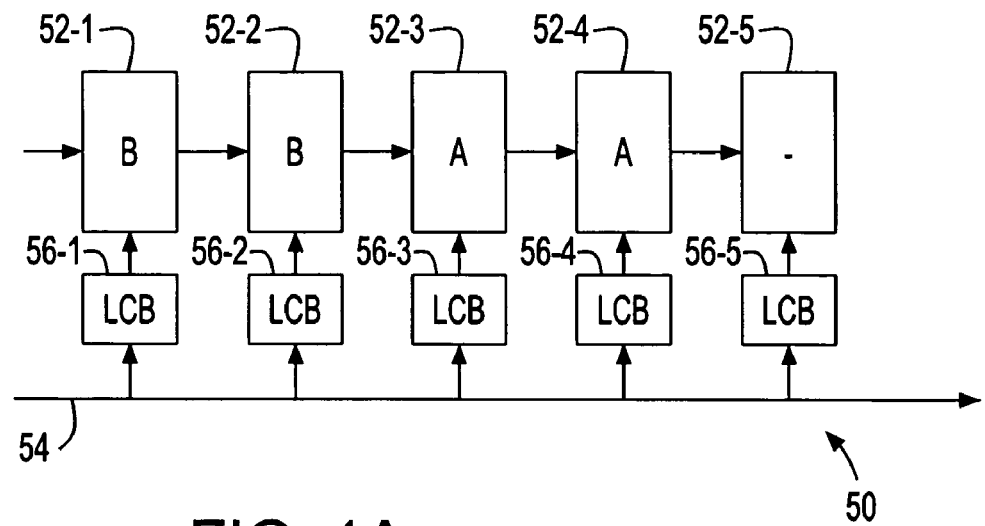
FIGS. 1A–B show data propagating through an example of a typical prior art N by M pipeline register cross section with a corresponding timing diagram.
Figure 1B:
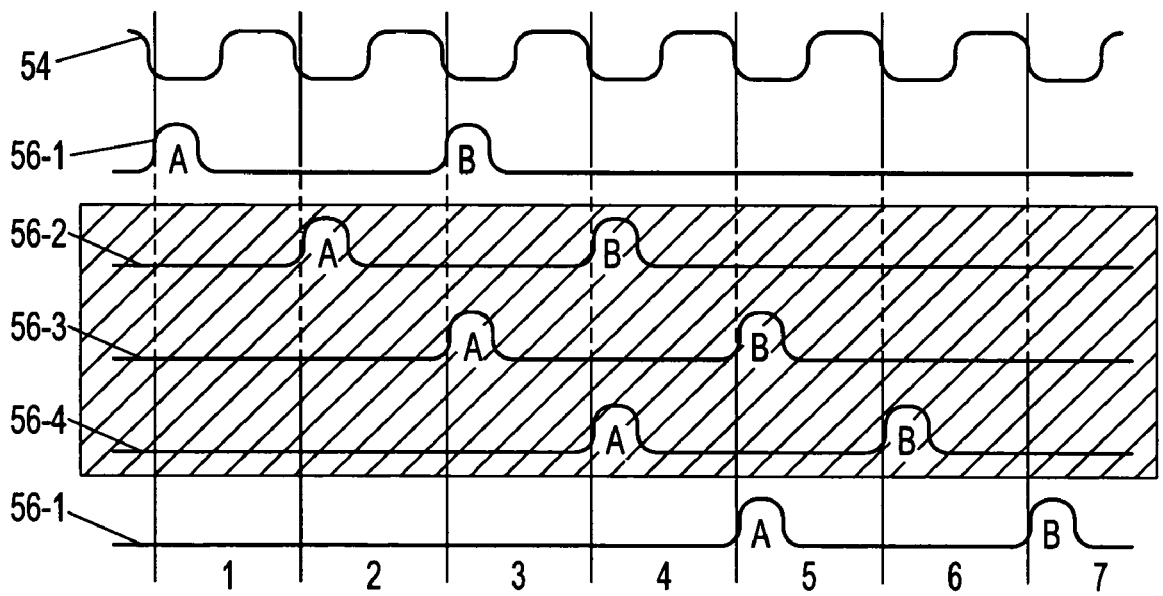

Turning now to the drawings and, more particularly, FIGS. 1A–B show data propagating through an example of a typical prior art N by M pipeline register cross section 50 with a corresponding timing diagram. In this example N is five pipeline stages 52-1, 52-2, 52-3, 52-4, 52-5 that are normally opaque by default and, M may be any register width suitable for the particular application. A global clock 54 provides a timing edge from which local clocks 56-1, 56-2, 56-3, 56-4, 56-5 are generated for each pipeline stage 52-1, 52-2, 52-3, 52-4, 52-5. Each stage 52-1, 52-2, 52-3, 52-4, 52-5 is clocked (pulsed transparent) to allow local data items to propagate through and be latched in the (subsequently opaque) stage 52-1, 52-2, 52-3, 52-4, 52-5. Data items propagate through the pipeline 50 clocked by a local clock pulse 56-1, 56-2, 56-3, 56-4, 56-5 that temporarily pulses the respective stage 52-1, 52-2, 52-3, 52-4, 52-5 transparent. After sufficient time for the data item to pass through, the stage 52-1, 52-2, 52-3, 52-4, 52-5 returns to its opaque state, latching the data item before new upstream data arrives, thereby avoiding potential data races.

So, in this example, a first data item (A) enters the pipeline 50 when the local clock 56-1 for the first stage 52-1 is pulsed high. It should be noted that although described herein as individual items traversing the pipeline, each item may be a collection of related or unrelated data traversing the pipeline in parallel. As the first data item propagates through the pipeline 50, because stages are normally held opaque, each subsequent stage 52-2, 52-3, 52-4, 52-5 is pulsed transparent to advance the data item. A second data item (B) enters the pipeline 50 two clock periods after the first, as the local clock 56-1 for the first stage 52-1 is pulsed high a second time. Subsequently, the second data item also propagates through the pipeline 50 and again, because stages are normally held opaque, each subsequent stage 52-2, 52-3, 52-4, 52-5 is pulsed transparent to advance the data item. Thus, holding stages normally opaque prevents each data item traversing the pipeline 50 from overtaking a downstream data item, causing a downstream race condition. This pessimistic, albeit conservative, clocking approach requires a clock pulse for each data item at each stage 52-1, 52-2, 52-3, 52-4, 52-5 regardless of whether the potential for a race condition exists downstream or not. By contrast, as set forth hereinbelow, the present invention avoids redundant clock pulses at each stage for each data item as required for this pessimistic clocking approach.

According to a preferred embodiment of the present invention, internal or intermediate pipeline segment stages are normally transparent by default, i.e., the latch stages are in the transparent clock gated mode or transparent mode. Data races between normally transparent stages are avoided by gating opaque a stage between each pair of data items concurrently propagating through the transparent pipeline. Thus, for multiple data items, a stage gated to its opaque state separates each pair, i.e., the normally transparent stage is temporarily gated to its opaque mode. Stages may also be placed in a non-clock gated or clocked mode such that when an incoming upstream data item reaches an opaque stage, the stage is clocked for one clock cycle to allow the upstream data item to propagate through it. Generally, transparent pipeline stages can operate in three different modes, transparent, opaque and clocked. As described hereinbelow, gating a latch or stage refers to providing the local clock level to switch the respective latch or stage, i.e., from transparent to opaque or vice versa. Further, for short stage pipelines with one or two intermediate stages, the number of operation modes can be simplified to two, clocked and transparent.

Figure 2:
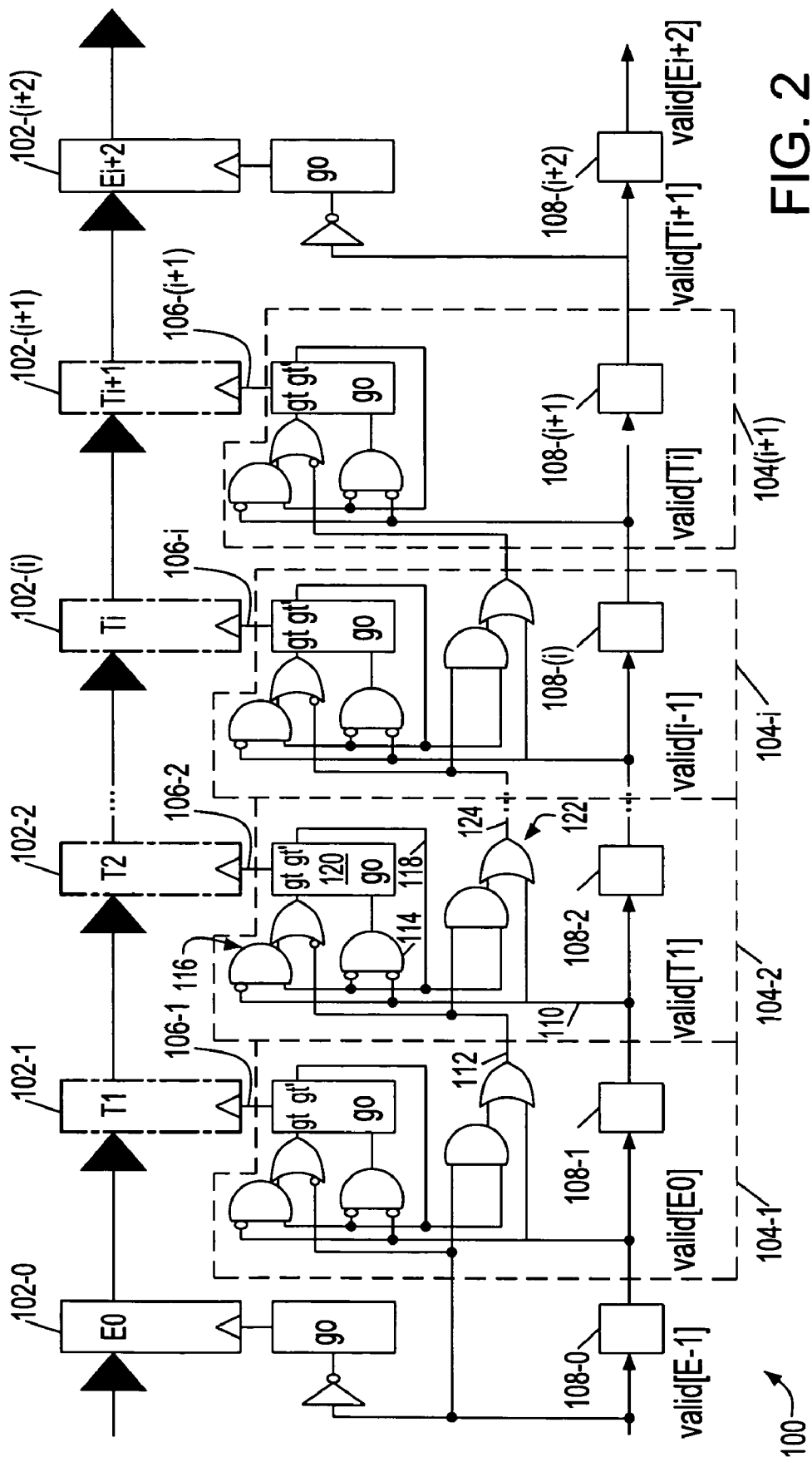
FIG. 2 shows an example of a preferred embodiment N by M pipeline cross section.

FIG. 2 shows an example of a preferred embodiment N by M pipeline cross section 100 according to the present invention with N=i+3 in this example. The N stage pipeline 100 includes an input stage 102-0, intermediate stages 102-1, 102-2, . . . , 102-i, 102-(i+1), and an output stage 102-(i+2). Each of the internal or intermediate stages 102-1, 102-2, . . . , 102-i, 102-(i+1) includes local clock control logic 104-1, 104-2, . . . ,104-i, 104-(i+1) generating a local clock 106-1, 106-2, . . . , 106-i, 106-(i+1) that, unlike the above prior art pipeline register 50 example of FIG. 1, holds the respective intermediate stages 102-1, 102-2, . . . , 102-i, 102-(i+1) normally transparent and selectively gated or pulsed opaque. Further, each pipeline stage 102-0, 102-1, 102-2, . . . , 102-i, 102-(i+1), 102-(i+2) includes a valid stage data indication in a corresponding place holder latch 108-0, 108-1, 108-2, . . . , 108-i, 108-(i+1), 108-(i+2) that tracks the forward or downstream edge of each data item as it propagates through the pipeline 100. By latching such a downstream edge, an incoming data tem is free to propagate through upstream latches without overtaking and interfering with the latched downstream edge. Thus, such a latched downstream edge separates each pair of data items sequentially traversing a preferred pipeline segment. Stages 102-0, 102-1, 102-2, . . . , 102-i, 102-(i+1), and 102-(i+2) may be any suitable latching register stage including, but not limited to a master/slave stage or pulsed mode stage.

Intermediate stage local clock control logic, e.g., 104-2, receives the data valid indication 110 and a predictor signal 112 from the immediately prior stage, 104-1 in this example. The data valid indication 110 and predictor signal 112 are combined in logic gates 114, 116 with a stage transparent indication (gt') 118 for the current stage to gate a local clock buffer 120 in holding the stage transparent (gt) or gating it opaque (go). In this particular example, the stage is gated transparent if it is currently transparent and the downstream edge of a data item is not in the immediately upstream stage as indicated by the placeholder latch from that stage or, the immediately upstream predictor signal, e.g., from 112, does not indicate an upstream data item is in the pipeline segment 100. Additionally, the data valid indication 110 and predictor signal 112 are combined with a stage transparent indication 118 in logic gate 122 to generate the predictor signal 124 from the current stage. The predictor signal 124 indicates that an upstream data item is in the pipeline, if the incoming data valid indication 110 indicates the data item is in the next previous stage or, the current stage is transparent and the incoming predictor signal, e.g., 112, indicates that a data item has entered the pipeline segment 100 upstream. Generally, the operation mode for an intermediate pipeline stage 102-$i$ is selected by logic 106-$i$ satisfying:

go[$T_i$]=NOT(valid[$T_{i-1}$]) AND NOT(gt_L 2[$T_i$]), gt[$T_i$]=NOT(valid[$T_{i-1}$]) AND gt_L2[$T_i$] OR NOT (predictor[$T_{i-1}$]), predictor[$T_i$]=predictor[$T_{i-1}$]AND gt_L2[$T_i$] OR valid[$T_{i-1}$], where gt'=gt_L2 and predictor[$T_i$] is predictor signal 124 to the $i^{th}$ stage.

Figure 3:
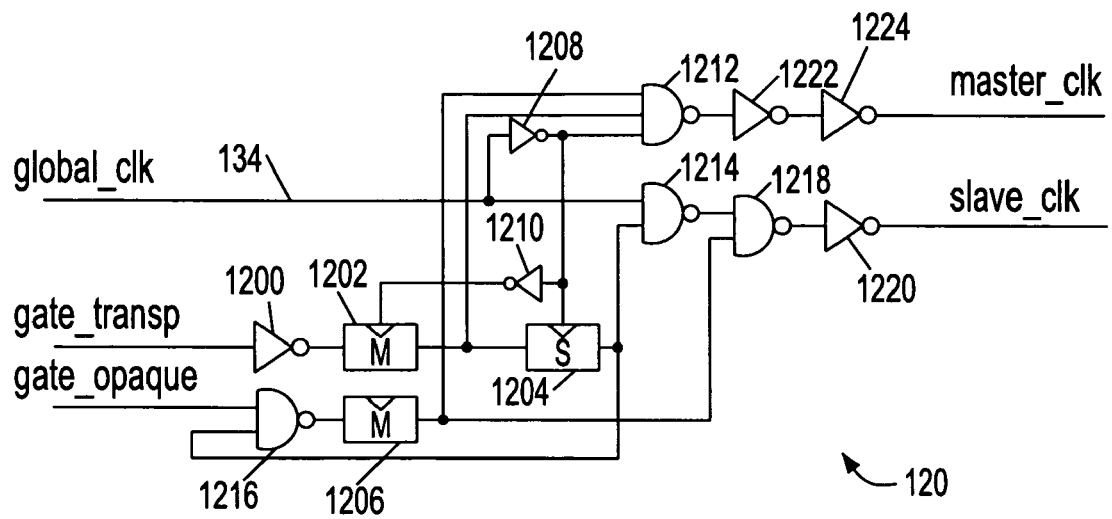
FIG. 3 shows an example of a suitable two phase local clock buffer for clocking a normally transparent intermediate master and slave stage in an N stage pipeline.

FIG. 3 shows an example of a suitable two phase local clock buffer 120 for clocking or gating a normally transparent intermediate master/slave stage, e.g., stage 104-2, in an N stage pipeline, where N>2, i.e., the pipeline includes one or more intermediate stages, such as segment 100 of FIG. 2. In this example, the transparent select signal gt is provided through an inverter 1200 to master latch or latch 1202. The master latch 1202 is paired with a slave latch 1204 and in a parallel with a second master latch 1206. A global clock is inverted by a pair of series connected inverters 1208, 1210 that clock the latches 1202, 1204, 1206. The output of the master latches 1202, 1206 are NANDed in NAND gate 1212 with the global clock from inverter 1208. The output of slave latch 1204 is NANDed with the opaque select go in NAND gate 1216 and with the global clock in NAND gate 1214. The output of NAND gate 1214 is NANDed with the output of master latch 1206 in NAND gate 1218. An inverter 1220 provides the correct slave clock output polarity. A pair of series connected inverters 1222, 1224 match the master clock delay with the slave clock delay, tightly coupling the edges of the two outputs. The stage transparent output gt' may be provided from an inverter (not shown) at the slave 1204 output.

So, while the clock block 120 is gated for transparent mode, the slave clock logic is sensitive to any changes on the opaque gating signal. Preferably, to avoid propagating glitches throughout the slave clock logic and the corresponding extra clock power consumption, the output of master latch 1206 should not glitch during transparent gated mode. When asserted, the transparent gating signal forces the opaque gating signal to a stable high value. So, changes on the opaque gating signal are delayed for one clock cycle after the transparent gating signal has been deasserted. This is acceptable since for the N-stage transparent pipeline, stages switches from transparent mode to at least one clocked mode cycle before switching to opaque gated mode.

There are two primary behavioral constraints on the input and output environment for any particular pipeline segment 100. First, each upstream data item (e.g. an instruction A) is held stable at the upstream environment input (e.g., input stage 102-0) until a subsequent valid data item (B) arrives. Second, only valid data is latched in the downstream output stage at the output environment. As each data item enters the pipeline 100 it is latched in an upstream stage and propagates locally asynchronously down the pipeline segment until it encounters another, downstream latched data item. So, each data item in the pipeline is latched in one of the pipeline latches that is gated opaque and provides an upstream boundary originating locally asynchronous propagation for that latched item and a downstream boundary for locally asynchronous propagation of an upstream data item.

In particular, intermediate stages, i.e., the intermediate stages 102-1, 102-2, . . . , 102-$i$, 102-(i+1) in this example, form a normally transparent pipeline segment. End stages 102-1 and 102-(i+2) form the upstream input and downstream output of the pipeline 100 and operate normally opaque. The valid stage data bit in place holder latches 108-0, 108-1, 108-2, . . . , 108-$i$, 108-(i+1), 108-(i+2) indicate the locations of valid data in the pipeline 100. Each place holder latch 108-0, 108-1, 108-2, . . . , 108-$i$, 108-(i+1), 108-(i+2) is clocked every clock cycle regardless of whether its associated stage is left transparent or held opaque.

Figure 4:
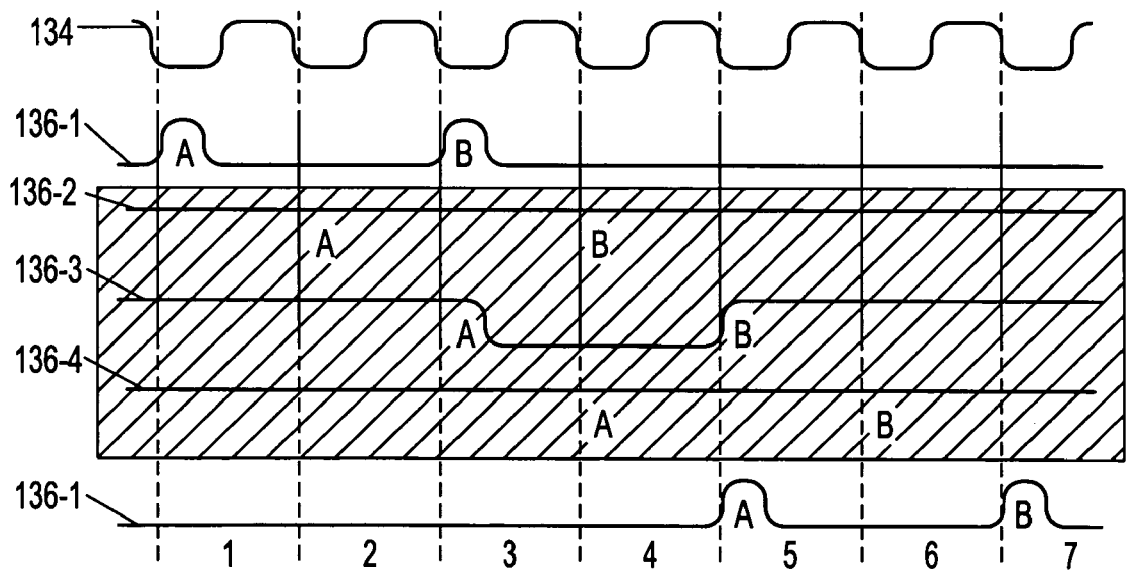
FIG. 4 shows a timing diagram example for two data items traversing a preferred embodiment pipeline segment.
Figure 5A:
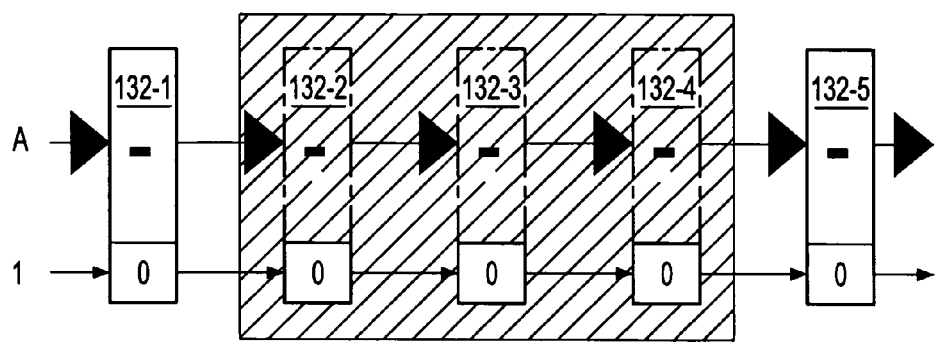
FIGS. 5A–H shows two data items traversing five stages of a preferred embodiment pipeline segment

FIG. 4 shows a timing diagram example for two data items traversing a preferred embodiment pipeline segment 130 of FIGS. 5A–H, five stages 132-1, 132-2, 132-3, 132-4, 132-5 in this example. A global clock 134 provides a global timing reference. Each of the stages 132-1, 132-2, 132-3, 132-4, 132-5 are clocked or gated by a local clock 136-1, 136-2, 136-3, 136-4, 136-5, derived locally from the global clock 134. Initially, as shown in FIG. 5A, the pipeline is empty. To facilitate discussion of the invention, with reference to the figures, transparent latches/stages are indicated in dotted lines, opaque latches/stages are indicated in solid lines. Also, a dash (—) indicates a don't care or a bubble. A data item traversing the pipeline is indicated by a letter with the lower case indicating short path or locally asynchronous propagation. Upper case indicates long path or stage by stage synchronized propagation. Capturing of a data item, i.e., at the end of a clock cycle, is indicated by dense cross hatching. Thick lines indicate a latch/stage acting as the current state holder for a valid bit or a data item.

Figure 5B:
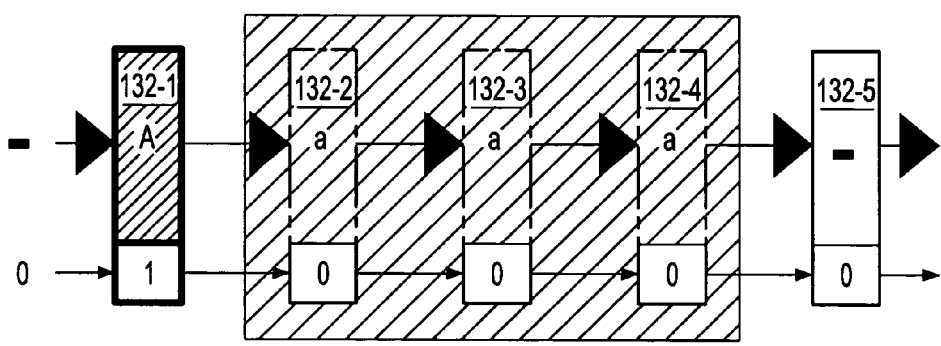

In the first clock cycle as shown in FIG. 5B, when a data item A enters the first stage 132-1, it is captured by a local clock pulse 136-1 and held stable as the boundary stage 132-1 becomes opaque. Consequently, boundary stage 132-1 becomes the state holder for the data item A. Since the intermediate stages 132-2, 132-3, and 132-4 are normally held in transparent mode, i.e., normally transparent, the data item A can propagate freely through transparent intermediate stages of the pipeline 130. At the end of the first cycle, all M bits of the data item A have propagated, at the very least, through the logic after input stage 132-1 and through register at intermediate stage 132-2. Further, since the stage delay is very likely different for each bit in each of the three normally transparent intermediate stages 132-2, 132-3 and 132-4, depending upon the individual bit delays, some bits are likely to propagate farther than others and, possibly, even to the output stage 132-5. However, since output stage 132-5 is opaque until the valid stage data bit arrives, these early arrival values are not latched in output stage 132-5, avoiding any risk of metastability occurring. So, at the end of this first clock cycle, the output of the first stage 132-1 holds data item A valid.

Figure 5C:
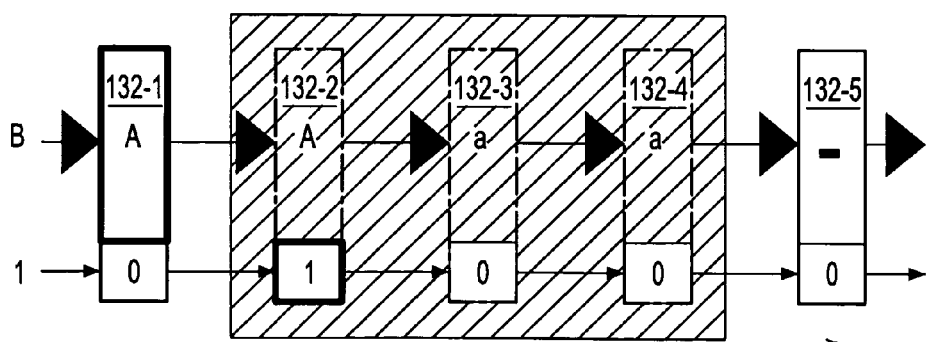

In the second clock cycle represented in FIG. 5C, the associated valid bit is captured in the second stage place holder latch to indicate the new downstream position of the data item A. However, since no valid data item immediately follows data item A, the first stage 132-1 continues to hold data item A latched and stable. Since the output of the transparent second stage 132-2 will remain constant and valid at least as long as the data item remains latched in the first stage 132-1, the second stage 132-2 need not be gated opaque and, therefore, the second stage 132-2 is kept transparent. Also, at this time another data item B is provided as a new input to the input boundary stage 132-1.

If the incoming data item B were gated into the input stage with the intermediate stages 132-2, 132-3, 132-4 transparent, portions (e.g., bits) of the upstream data item B might move through the short logic path and overtake downstream data items (e.g., A) with individual bits moving through a longer logic path. For example, the least significant bit of an M bit by M bit multiplier has a much shorter path delay than the most significant bit. Thus, gating two values into the input stage 132-1 as a data item (B) may cause races (with a partial product A) in the intermediate stages 132-2, 132-3, 132-4 with bits from upstream data accidentally overwriting downstream data because each of the M bits may have a different stage logic path depth. Previously races were avoided by holding the stages normally opaque and pulsing all of the latches of each stage transparent, clocking each, at a minimum, once for each data item passing through the pipeline to avoid data races between latch stages. A preferred embodiment pipeline ignores inconsequential data races beyond the forward edge, in data items propagating through empty downstream stages; and, avoids real potential races by latching the forward downstream valid stage, especially when a new data item enters upstream and without placing additional timing constraints on the pipeline. Further, long path and short path delays through the pipeline 130 may be arbitrarily long, provided the stage logic delay complies with the setup and hold time requirements for the particular stage 132-2, 132-3, 132-4, 132-5, as would be required in a normally opaque pipeline.

Figure 5D:
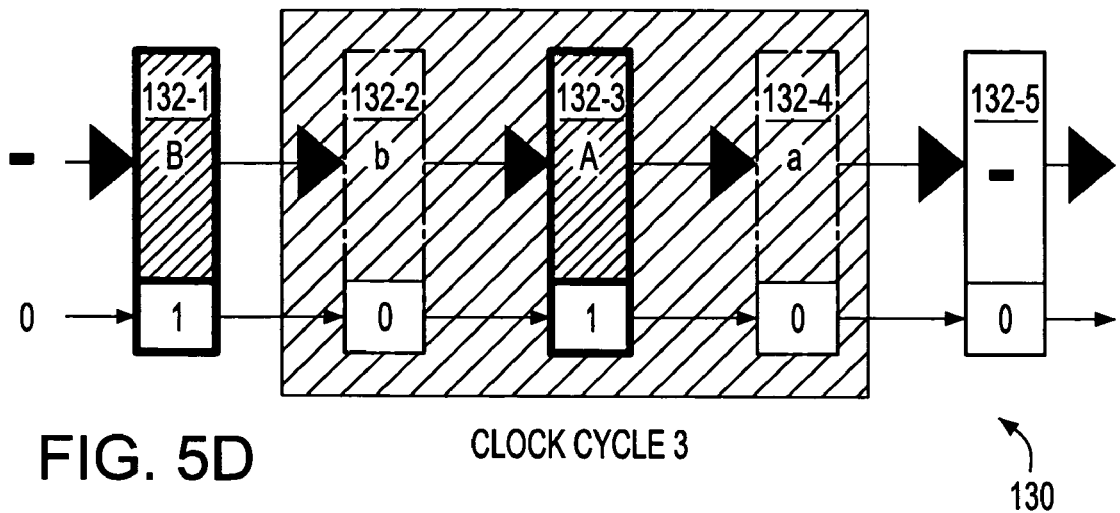

So, in FIGS. 5D, the third clock cycle begins as the new data item B is latched into input boundary stage 132-1 coincident with setting the corresponding valid stage data bit. Therefore, however, although data item A is known to be currently valid at intermediate stage 132-3 as indicated by the state of place holder there, the input boundary stage 132-1 no longer maintains data item A. So, because it is not latched in any of the stages, data item A is momentarily completely asynchronous and transient. The local clock 136-3 drops to capture and hold A stable, fixing a new upstream boundary for data item A. With the local clock 136-3 low, the intermediate stage 132-3 is gated opaque and remains opaque until, in a subsequent clock cycle, the stage data valid bit indicates that data item B has reached this internal stage 132-3. So, at the end of this third clock cycle, the normally opaque input boundary stage 132-1 is the state holder for data item B and the gated opaque intermediate stage 132-3 is state holder for data item A. Intermediate stages 132-2 and 132-4 remain transparent. Data item B can propagate freely through logic between stages 132-1 and 132-3 and data item A can propagate freely through logic between stages 132-3 and 132-5, i.e., short path propagation through transparent intermediate stages 132-2 and 132-4, respectively.

Figure 5E:
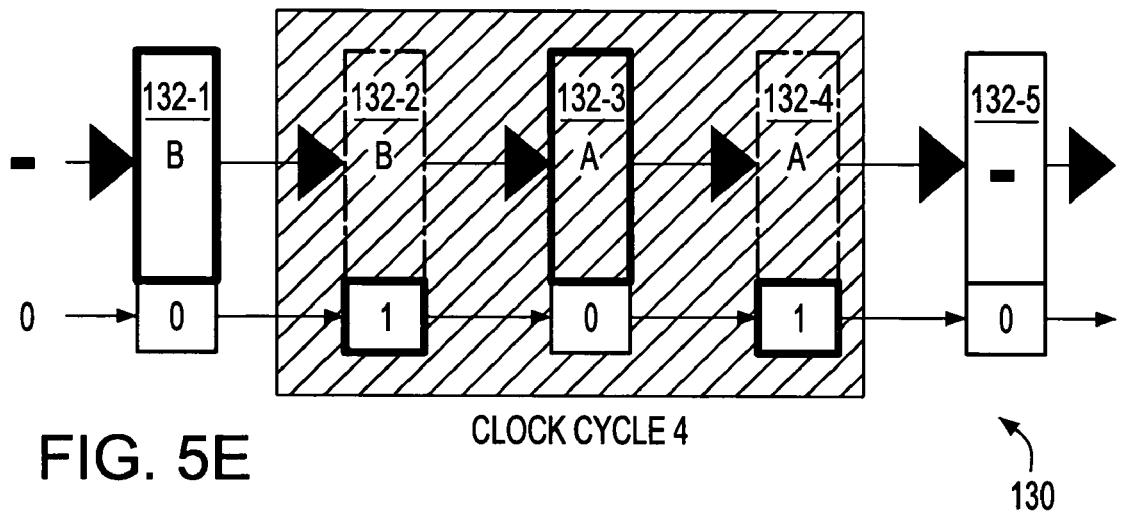
Figure 5F:
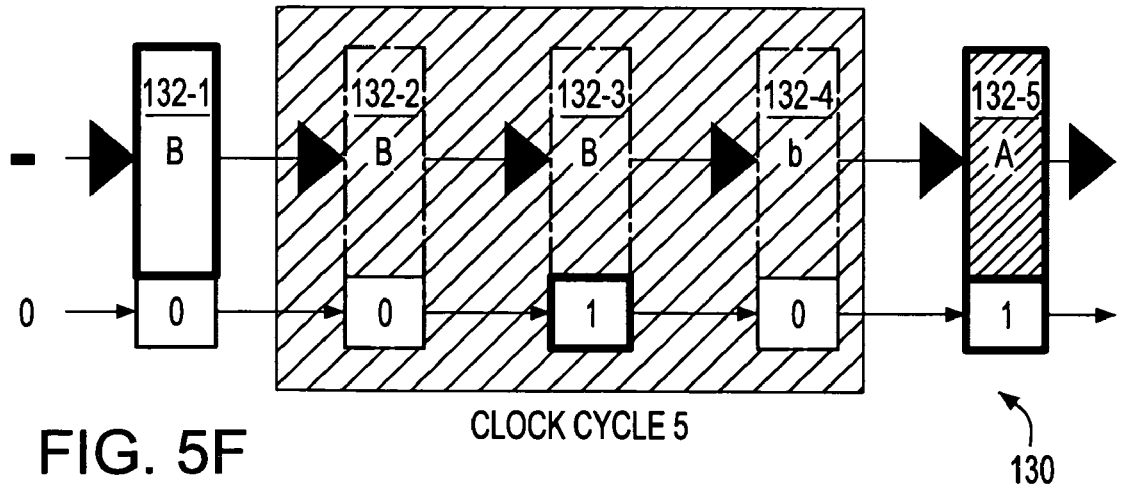

In the fourth clock cycle as shown in FIG. 5E, stages remain unchanged, i.e., the input boundary stage 132-1 and intermediate stage 132-3 remain opaque holding data items B and A, respectively, and intermediate stages 132-2 and 132-4 remain transparent. The corresponding valid stage data bits advance one stage each to placeholder latches associated with intermediate stages 132-2 and 132-4. Subsequently, in the fifth clock cycle as shown in FIG. 5F, each corresponding valid stage data bit indicates that the data items B, A have reached a respective downstream boundary stage 132-3 and 132-5. Thus, valid data is available at the input to pipeline output stage 132-5, which is pulsed transparent and returned opaque to capture data item A. Simultaneously, intermediate latch 132-3 is reverted to transparent mode, passing upstream data item B. The valid stage data bit in each of the respective place holder latches indicates that data item B resides in intermediate stage 132-3 and that data item A is available at output stage 132-5.

Figure 5G:
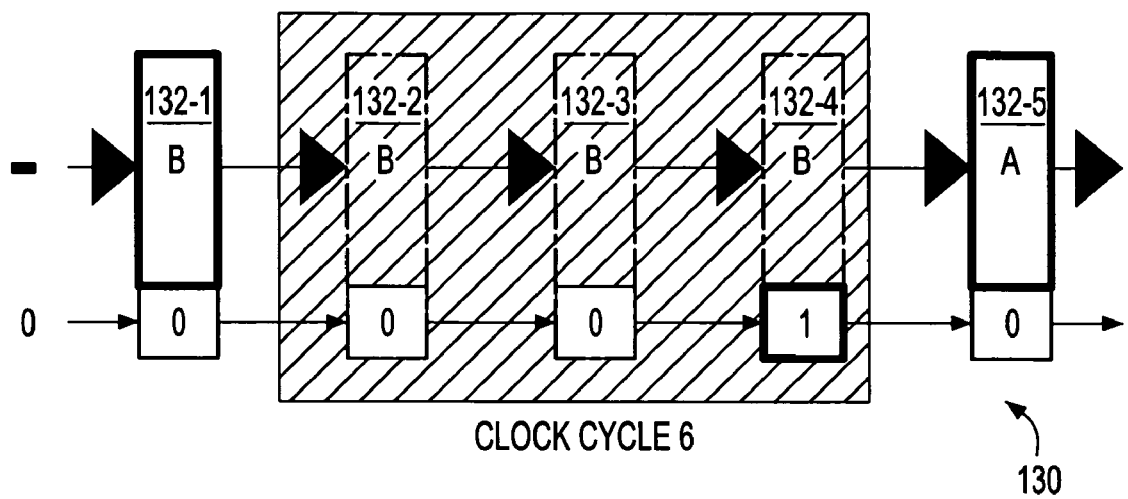
Figure 5H:
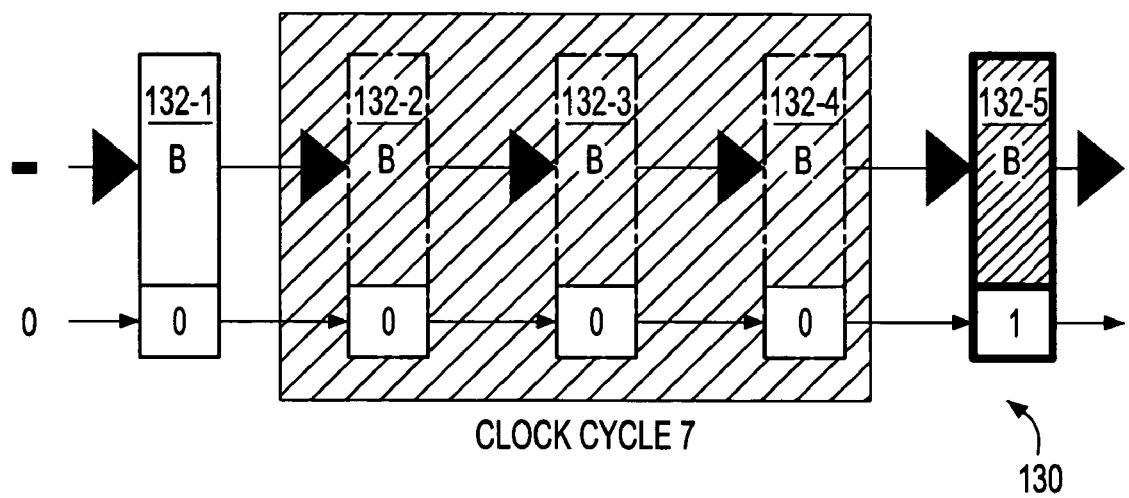

Thereafter, in the sixth clock cycle as shown in FIG. 5G, data item B, latched in input stage 132-1, propagates locally asynchronously within the pipeline 130 and output stage 132-5 continues to hold data item A. The valid data bit corresponding to data item B continues its progression through the pipeline 130, as it is latched in the place holder latch in intermediate stage 132-4. Finally, provided, data item A is not stalled at output stage 132-5, in the seventh clock cycle as shown in FIG. 5H, the valid bit associated with data item B reaches output stage 132-5, indicating that data item B has reached output stage 132-5. The output stage 132-5 is pulsed transparent and returned opaque to capture data item B. Simultaneously, the valid stage data bit is latched into the place holder latch, indicating that data item B is available at output stage 132-5. In the next subsequent clock cycle (not shown) after data item B exits the pipeline segment 130, the pipeline segment may be considered empty as in FIG. 5A, waiting for the next data item (not shown) to be presented to the upstream input stage 132-1.

As a general rule, an opaque state holder stage must separate each upstream data item from a downstream data item to avoid race conditions and, optimally, only when the potential exists for the upstream data item to overwrite the downstream data item. For example, a circular pipeline (not shown) must include at least one and, preferably only one, opaque state holder stage for each circulating data item A in the pipeline; for a single data item A, the opaque state holder stage separates the data item from its tail. In non-linear pipeline segments, data items can have multiple state holder stages, each holding some form of the data item. If any of the state holder stages are overwritten, a new state holder is provided for the data item at that portion of the pipeline. Advantageously, instead of clocking each stage to advance each data item, stage by stage clocking is dramatically reduced without causing data races because only stages necessary to advance a pair of data items concurrently through the pipeline are clocked. Further, relatively simple logic may be used to gate pipeline stages correctly.

Figure 6:
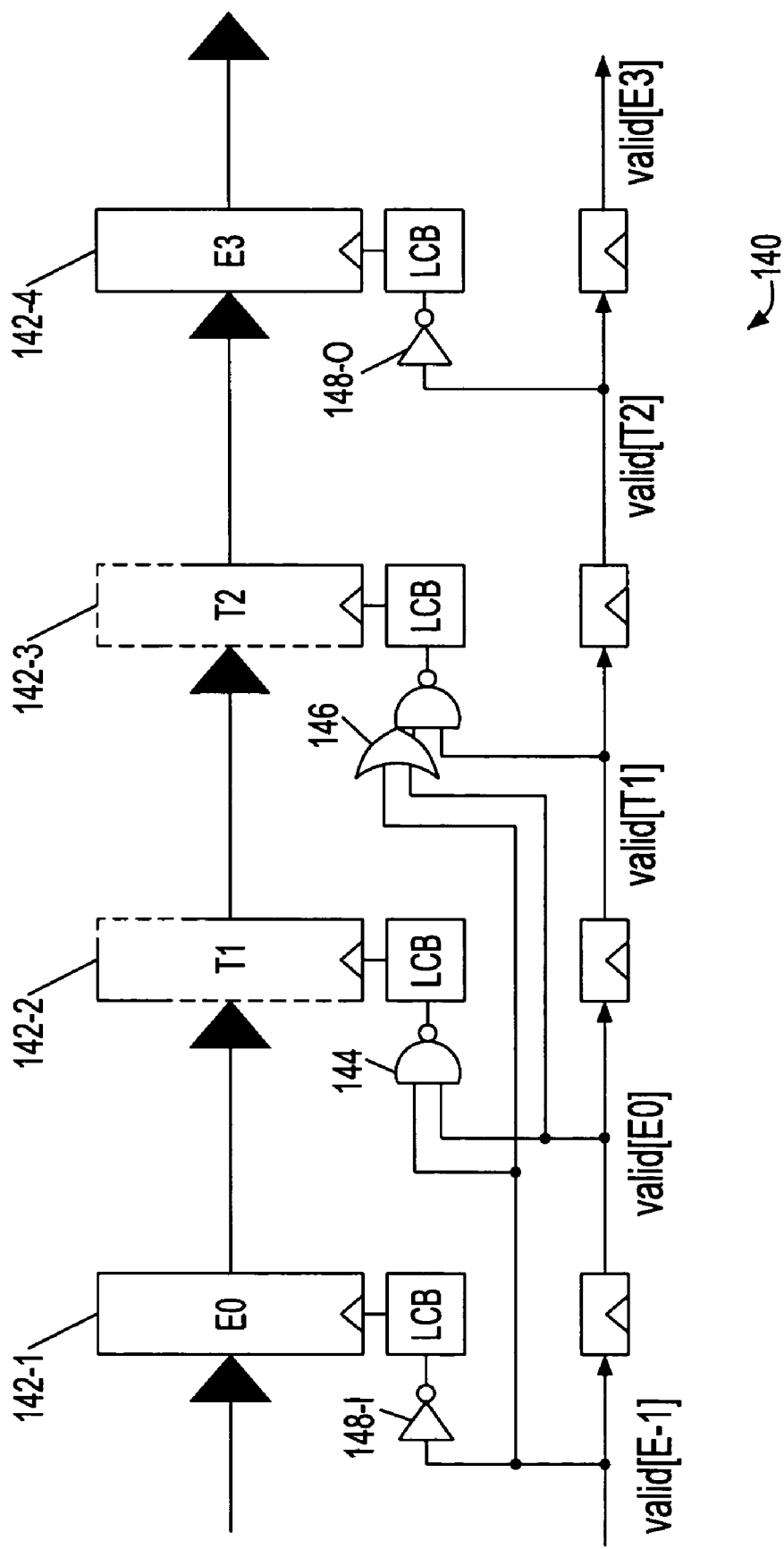
FIG. 6 shows simplified operation for a short (two intermediate stages) pipeline segment example with a normally opaque input stage, two normally transparent intermediate stages and a normally opaque output stage.

FIG. 6 shows a simplified implementation for a short (two intermediate stages) pipeline segment example 140 with a normally opaque input stage 142-1, two normally transparent intermediate stages 142-2, 142-3 and a normally opaque output stage 142-4. Boundary environment (input or output) data edge indicators are identified E0 and E3, with the boundary data edge indicator from an immediately preceding segment being identified E−1. Intermediate data edge indicators for stages 142-2, 142-3 are identified $valid_{T1}$ and $valid_{T2}$, respectively. Logic 144, 146 associated with each of the intermediate pipeline stages 142-2, 142-3, detects whether the corresponding stage should switch to clocked mode or stay transparent. Generally, one of the transparent stages is in clocked mode to separate two data items propagating concurrently through the transparent stages of the pipeline. So, one normally transparent stage in a short pipeline segment should be clocked when at least two segment place holder latches are presented with valid data bits. Thus, for this example, the local clock logic 144, 146 and inverters 148I, 148O provide the proper clock select relationship at each stage, i.e., $gate_{E0}$=NOT ($valid_{E-1}$)

$gate_{T1}$=NOT ($valid_{E-1}$ AND $valid_{E0}$)

$gate_{T2}$=NOT ($valid_{T1}$ AND ($valid_{E-1}$ OR $valid_{E0}$))

$gate_{E3}$=NOT ($valid_{T2}$).

The logic represented in the Figures is for example only and not intended as a limitation. Any suitable equivalent logic or any suitable control may be substituted. Also, in each of the examples provided herein a stage at output environment for one segment, e.g., stage 102-(i+2) of segment 100 in FIG. 2, may be common stage at input environment for another segment, e.g., 142-1 in segment 140, i.e., stage 102-(i+2) and stage 142-1 may be the same stage.

Figure 7A:
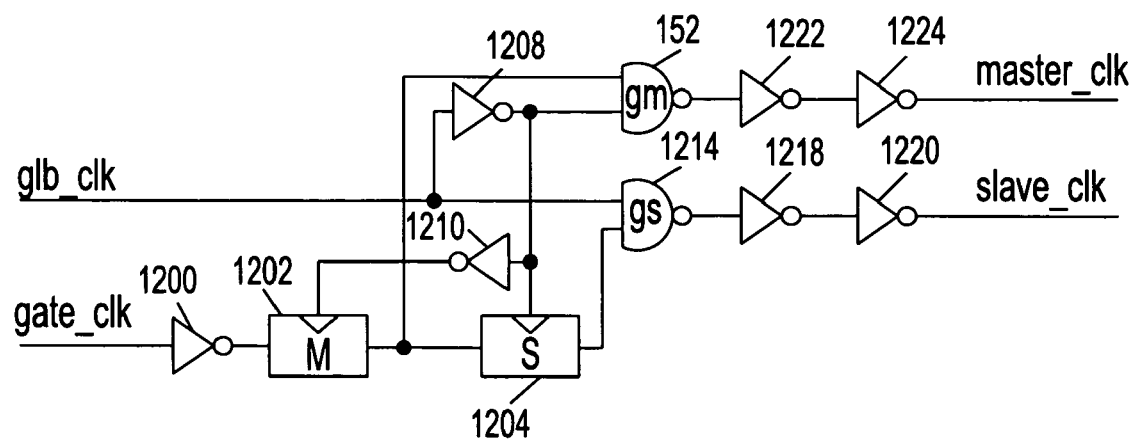
FIGS. 7A–B show examples of suitable local clock blocks (LCB) supporting transparent mode clock gating in a short (two intermediate stage) pipeline segment.
Figure 7B:
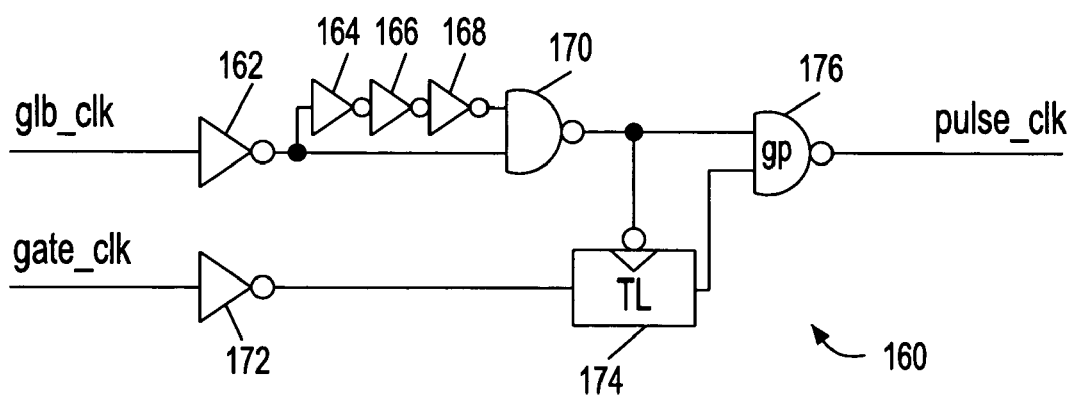

FIGS. 7A–B show examples of suitable local clock buffers or local clock blocks (LCB) supporting transparent mode clock gating in a short (two intermediate stage) pipeline segment, e.g., 140 in FIG. 6. FIG. 7A shows clock block logic 150 for a two-phase clocked master/slave pipeline, substantially similar to the example 120 of FIG. 3 with identical blocks labeled identically. In this example, a single clock gating signal replaces transparent (gt) and opaque (go) signals. Also, since this clock block includes a single master latch 1202, a 2 input NAND gate 152 combines the output of the master latch 1202 with the inverted global clock from inverter 1208. The master and slave latches 1202, 1204 latch the clock gating signal to prevent glitches on the local clocks. When both master 1202 and slave 1204 are latched low, both outputs are held high (logic 1) for transparency. When either/both are latched high, the global clock passes to the stage, as master and slave clocks, alternately making the master and slave latches opaque.

FIG. 7B shows a pulse clock driver 160 for driving pulse-mode pipeline stages, where stages are clocked with a narrow pulse to avoid data races between adjacent pipeline stages. In this example the global clock is provided to an inverter 162. The output of the inverter 162 is an input to a pulse generator that includes 3 inverters 164, 166, 168, as a series inverter delay and a NAND gate 170. The global clock is delayed and reinverted by the series inverter delay and, as a result, if the clock block operates in non-gated mode, the NAND gate 170 provides a three inverter (164, 166, 168) long high going pulse each time the global clock falls. Again in this example, a single gate signal is provided through an inverter 172 to a latch 174, which is gated by the clock pulse from the pulse generator. The output of the latch 174 is combined with clock pulses from the pulse generator in NAND gate 176. Whenever the latch 174 is latched high, a pulse output is provided by NAND gate 176. So, in transparent mode the clock gating signal can arrive at the inverter 172 just before the falling edge of the clock pulse. Thus, in a transparent pipeline stage, the clock gating signal can arrive at the end of the pulse.

During a pipeline stall, the stalled pipeline segment, e.g., an execution unit in a microprocessor, holds current pipeline data items until the stall condition ends. For example simultaneous writes to a shared microprocessor bus may require an execution unit to stall and wait until the bus is available. During such a stall, the execution unit must hold a downstream data item in its output stage and also halt upstream data items. Such data holds can be effected using either elective opaque mode clock gating (i.e., placing stages in opaque mode and holding the data in the pipeline) or, through data recirculation by feeding the output back to the input, e.g., through a muliplexor, as described hereinabove. Data recirculation can be used where the clock block supports only clocked mode and transparent mode, e.g., the two transparent stage pipeline segment 140 in FIG. 6.

Figure 8:
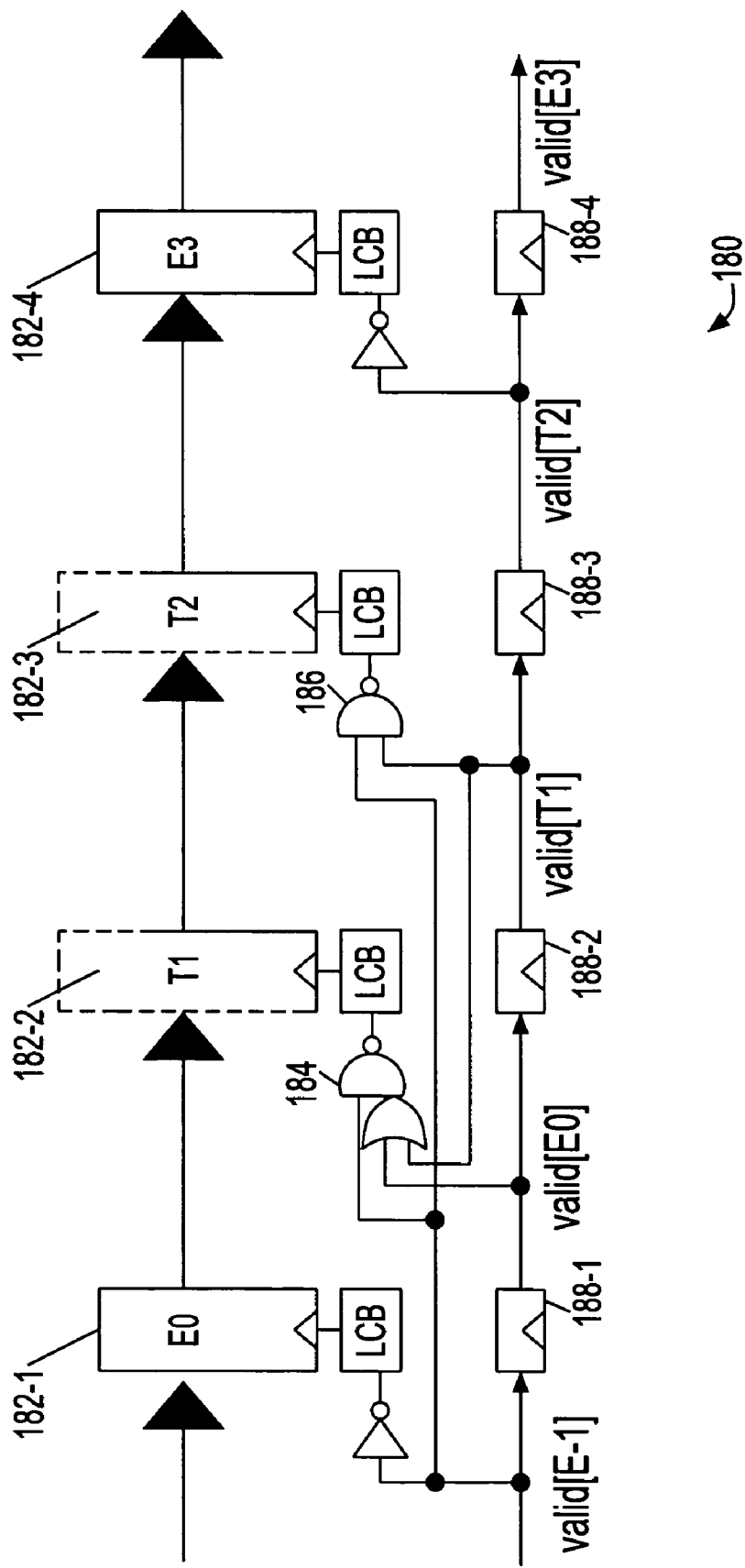
FIG. 8 shows an example of a short pipeline with four stages wherein logic folding reduces the maximum load on the valid stage data signals and evenly distributes the signal loads.

FIG. 8 shows an example of a short pipeline 180 with four stages 182-1, 182-2, 182-3, 182-4, substantially similar to the example 140 of FIG. 6 wherein logic folding 184, 186 reduces the maximum load on the valid stage data signals and, further, more evenly distributes the signal loads. In this example, each place holder 188-1, 188-2, 188-3, 188-4 output drives a fanout of no more than 2. Folding is possible because: as each data item passes the pipeline mid-point, the data item can be held at the mid-point instead of at the stage in which the particular data item currently resides; and, because any new data item entering the pipeline propagates from the entry point to the midpoint in the same or fewer clock cycles as a data item at the midpoint takes to reach the end stage. So, when incoming data items propagate to the mid-point, simultaneously, downstream data items held at the midpoint propagate to the pipeline output environment. In particular, the folded look behind logic 184, 186 of this example determines pipeline utilization over the entire range of stages 182-1, 182-2, 182-3, 182-4 based on the upstream and downstream pipeline valid stage data signals.

Thus, advantageously, preferred embodiment folded look-behind logic (e.g., 184, 186) does not distribute valid stage data signals over several pipeline stages, which might otherwise slow signal propagation to the point of making the look behind logic critical path signals. Folding redistributes signal delays, ameliorating the normal distribution delay concerns for the look-behind control logic and can reduce or contain the number of stages each valid stage data signal must drive. Furthermore, in a typical non-folded pipeline, the latch stages downstream of the mid-point tend to be clocked more often than the latch stages upstream of the mid-point. However, the opposite is true in a folded pipeline. Folding can thus be used advantageously to further reduce pipeline clock power when upstream latch stages contain fewer latches than the downstream latch stages.

Figure 9A:
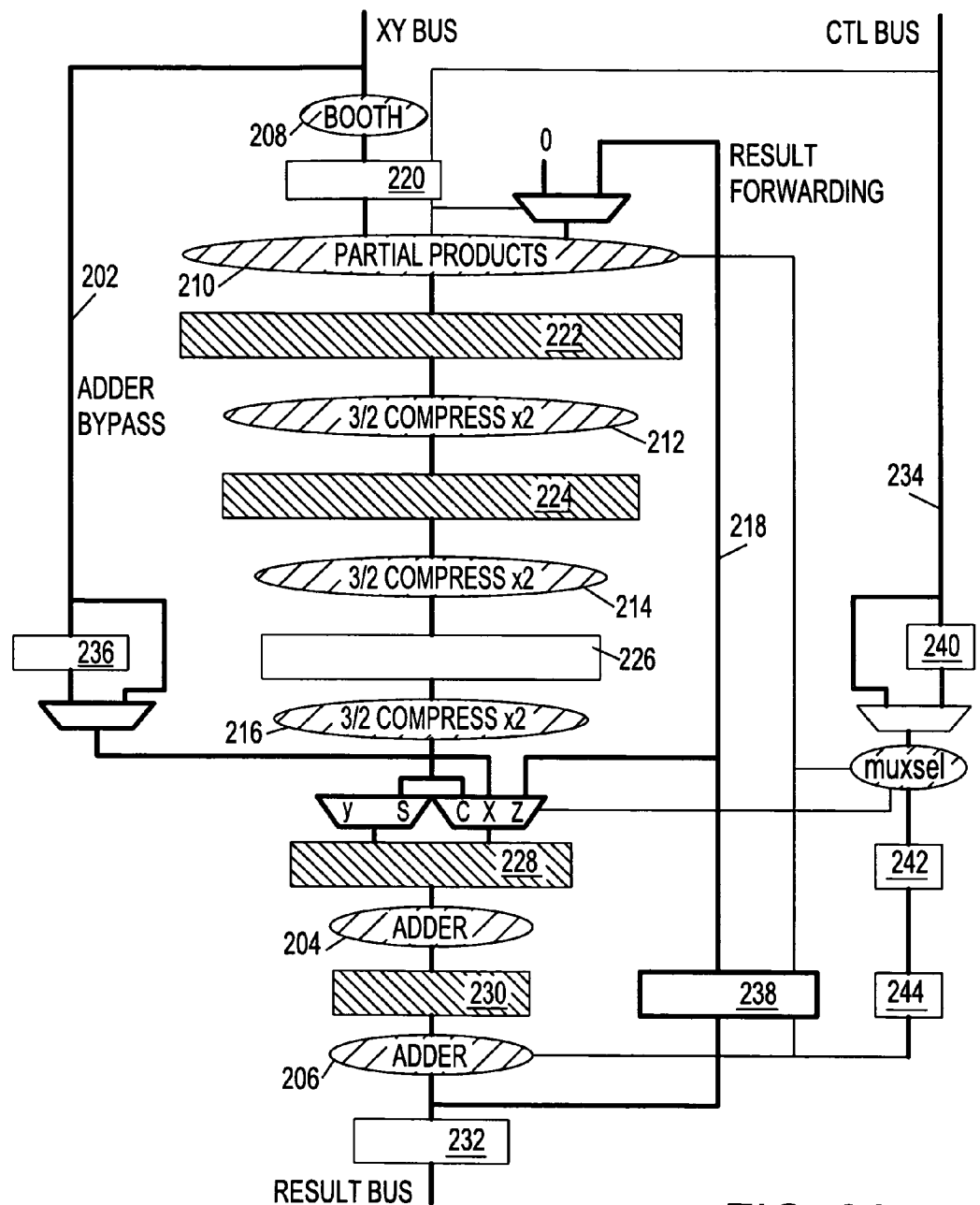
FIGS. 9A–C show to a high frequency Multiply/Add-Accumulate (MAAC) unit and comparison of application of transparent pipelining with normally opaque pipelining to the MAAC unit.
Figure 9B:
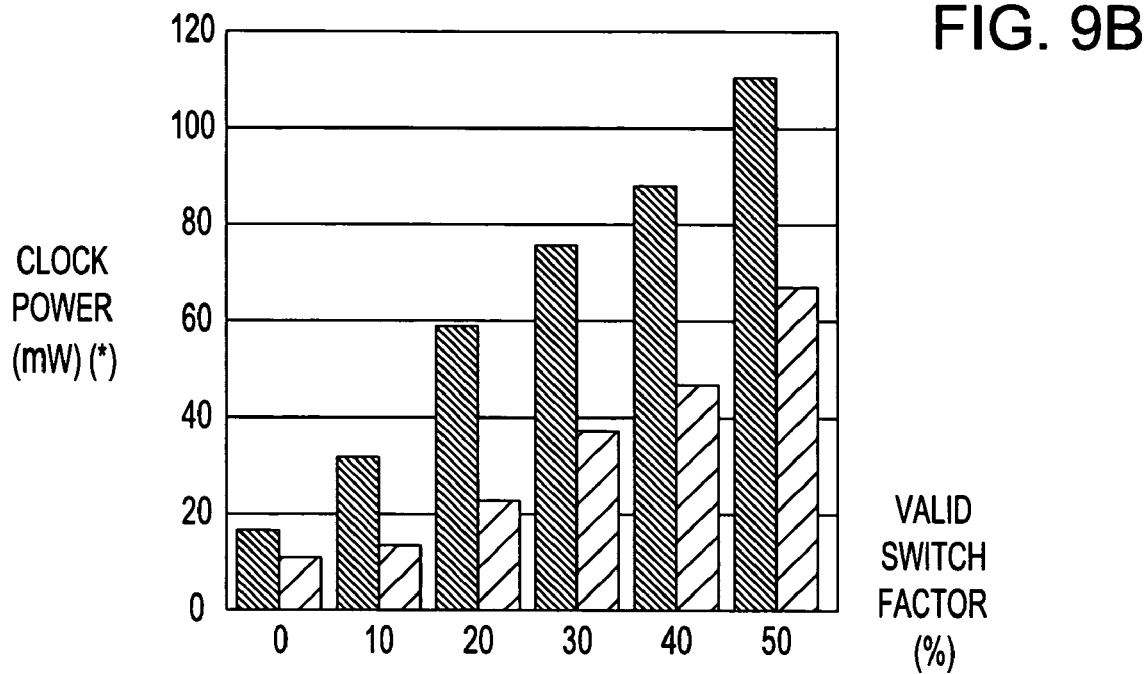
Figure 9C:
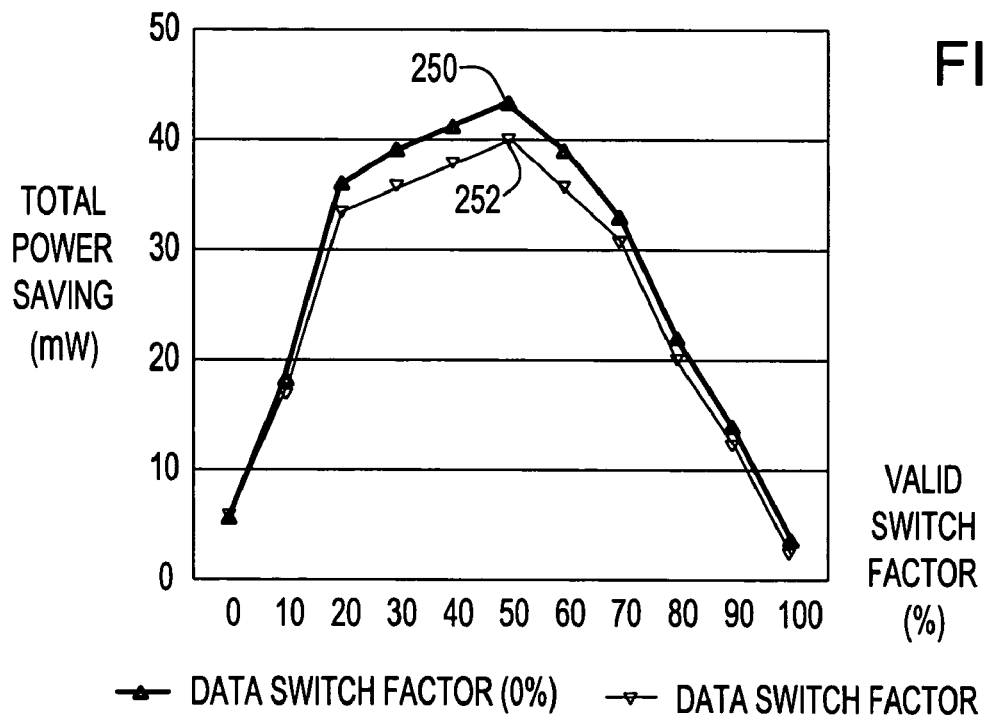

FIGS. 9A–C show to a high frequency Multiply/Add-Accumulate (MAAC) unit 200 and the advantage of application of transparent pipelining according to a preferred embodiment of the present invention to the MAAC unit 200. In this example, the MAAC 200 of FIG. 9A is a 32×32 fixed-point Booth encoded multiplier with a final adder. FIG. 9B shows a bar chart example of comparing absolute clock power for fully opaque and preferred embodiment transparent pipelining. FIG. 11C shows an example of absolute power saving extremes for the MAAC unit 200 with intermediate normally transparent stages. The MAAC unit 200 includes a bypass path 202 that allows add instructions to enter the final adder 204, 206 directly without having to pass through the multiply stages 208, 210, 212, 214, 216. Multiply-accumulate instructions are enabled through a forwarding path 218. The MAAC unit 200 includes a seven stage pipeline 220, 222, 224, 226, 228, 230, 232. In the comparisons shown in FIGS. 9B and C intermediate stages 222, 224, 228, 230 are normally transparent for the preferred embodiment example, which is compared against all stages 220, 222, 224, 226, 228, 230, 232 being normally opaque and pulsed transparent. Control is provided in control path 234. Each of the Adder bypass path 202, result forwarding path 218 and control path 234 include stages 236, 238, 240, 242 and 244 that are opaque regardless of whether latches 222, 224, 228 and 230 are normally transparent or opaque.

FIG. 9B shows a bar chart comparison of clock power versus switch factor for 5 data points with the normally opaque result on the left and the preferred embodiment example on the right at each data point. For this example, the maximum relative clock power saving peaks at 60% at a pipeline utilization factor (valid switching factor) of 20%. FIG. 9C shows a comparison of absolute clock power saving extremes of transparently clock gated pipeline stages power savings when the data input switching factor is at 0% for curve 250 and at 100% for curve 252, illustrating the best and worst case extra glitching power introduced as a result of the increased logic depth in the transparent segments of the pipeline. In particular, the maximum absolute power savings can be expected at a pipeline utilization factor of 50%. Also, the introduced glitch power is not expected to be more than 10% of the clock power savings. Further, as the pipeline utilization factor increases, glitch power decreases because as the utilization factor grows, there are more back-to-back instructions in the pipeline and more pipeline stages have to be clocked. As more pipeline stages are clocked glitch power is reduced. For logic with moderate glitch tendencies, therefore, a transparent pipeline always performs as good as, or better, than an opaque clock gated pipeline.

Thus, advantageously, transparent pipelining reduces dynamic clock power dissipation and facilitates optimal clock gating. Data registers in intermediate transparent pipeline stages are normally only clocked to separate back-to-back data items from interfering with each other. Thus, clock power is minimal for unclocked stages and significantly reduced over traditional pipeline clock gating techniques. Dynamic clock power dissipation may be reduced by 40–60% at pipeline utilization factors between 20–60%.

Relaxed clocking requirements may also allow gating local clocks for a sufficiently long period of time to power down the local clock block(s), e.g., using retentive leakage reduction techniques. Optionally, a glitch free multiplexor bypass path may be provided for non-transparent pipeline latches, provided the cost of additional pipeline stage power and delay is acceptable. However, transparent pipelining is particularly well suited to linear pipelines with few multiplexors and few or no branches and especially, for very high frequency pipelines. This is because bubbles are more common in high frequency microprocessor pipelines, as fewer data path functions are able to provide one-cycle results. Glitch power increase in linear pipelines is fairly low and, typically, can be limited to about 10% of the clock power saved. Again, pipeline utilization factors in the range of 20–60% derive the largest power savings. In the instances where gating off all of the stages of a segment might introduce too much glitching or, where signals may originate so far upstream from a stage that the valid stage data signal arrives too late for clock gating, a subset of the pipeline stage (or register) latches may be selected as normally transparent.

Thus, advantageously, stages are dynamically adapted to the current state of the pipeline, on a cycle-by-cycle basis, without reducing the pipeline operation frequency. Latch stages are opaque to separate closely spaced data items in a pipeline and otherwise transparent. By keeping stages transparent by default, data items that are sufficiently separated in time (i.e., clock cycles) propagate through the pipeline without clock pulses, locally asynchronous but still globally synchronous. Whenever the number of clock pulses necessary for a data item to propagate through the pipeline is fewer than the number of stages, because normally transparent stages are switched opaque only to avoid data races, multiple data items can simultaneously traverse the pipeline at reduced power.

While the invention has been described in terms of preferred embodiments, those skilled in the art will recognize that the invention can be practiced with modification within the spirit and scope of the appended claims.

What is claimed is:

1. A synchronous pipeline segment clocked by a global clock, said synchronous pipeline segment comprising:
   a plurality of sequential pipeline stages including an input stage, an output stage and at least one intermediate stage;
   a plurality of local clock buffers, each local clock buffer providing a local clock to one said corresponding pipeline stage, said input stage and said output stage being normally opaque and at least one intermediate stage being normally transparent responsive to a corresponding said local clock; and
   a local clock control circuit providing clock selection control to each of said plurality of clock buffers, said clock selection control determining whether each said pipeline stage is gated transparent, clocked or gated opaque responsive to said corresponding local clock.

2. A synchronous pipeline segment as in claim 1, wherein said at least one intermediate stage is a plurality of intermediate stages.

3. A synchronous pipeline segment as in claim 2, wherein each of said plurality of intermediate stages is selectively clocked or gated opaque, data items traversing said pipeline segment passing locally asynchronously and being separated by clocked or opaque gated said intermediate stages.

4. A synchronous pipeline segment as in claim 3, wherein said local clock control circuit comprises a plurality of place holder latches, each place holder latch indicating whether a data item edge is at a corresponding said pipeline stage.

5. A synchronous pipeline segment as in claim 4, wherein each said local clock is provided responsive to the contents of one or more of said plurality of place holder latches.

6. A synchronous pipeline segment as in claim 5, wherein said each place holder latch receives a data edge indicator from an upstream stage, the forward edge of each of said data items being indicated locally by said data edge indicator.

7. A synchronous pipeline segment as in claim 6, wherein said each local clock buffer providing said local clock to one of said plurality of intermediate stages receives at least two clock gating indicators responsive to said data edge indicators, each of said plurality of intermediate stages being clocked opaque responsive to an indication of valid data being provided to at least two of said plurality of sequential pipeline stages.

8. A synchronous pipeline segment as in claim 7, wherein at least one said data edge indicator input to at least one said clock buffer is an input to a downstream place holder latch.

9. A synchronous pipeline segment as in claim 7, wherein each of said input stage and said output stage are clocked transparent responsive to a valid data indication on an input to a corresponding said place holder latch.

10. A synchronous pipeline segment as in claim 9, wherein said plurality of intermediate stages is two intermediate stages.

11. A synchronous pipeline segment as in claim 10, wherein each of said plurality of sequential pipeline stages is clocked responsive to the set of relationships described by $$\text{gate}_{E0} = \text{NOT } (\text{valid}_{E-1}),$$

$$\text{gate}_{T1} = \text{NOT } (\text{valid}_{E-1} \text{ AND } \text{valid}_{E0}),$$

$$\text{gate}_{T2} = \text{NOT } (\text{valid}_{T1} \text{ AND } (\text{valid}_{E-1} \text{ OR } \text{valid}_{E0}))$$
and $$\text{gate}_{E3} = \text{NOT } (\text{valid}_{T2}),$$

where the contents of each said corresponding place holder latch are designated E0, T1, T2 and E3, respectively, and said data edge indicator being provided to said place holder latch corresponding to said input stage is designated E−1.

12. A synchronous pipeline segment as in claim 9, wherein said plurality of intermediate stages is three or more intermediate stages.

13. A synchronous pipeline segment as in claim 12, wherein each of said plurality of intermediate stages is clocked responsive to the set of relationships described by go[$T_i$]=NOT(valid[$T_{i-1}$]) AND NOT($gt\_L2$[$T_i$]), gt[$T_i$]=NOT(valid[$T_{i-1}$]) AND gt_L2[$T_i$] OR NOT (predictor[$T_{i-1}$]), and predictor[$T_i$]=predictor[$T_{i-1}$] AND gt_L2[$T_i$] OR valid[$T_{i-1}$], where gt is a gate transparent signal to a corresponding intermediate stage, gt_L2 is a gate transparent signal from said corresponding intermediate stage and predictor indicates the presence of an upstream data item in said pipeline segment.

14. A synchronous pipeline segment as in claim 9, further comprising logic separating at least 2 adjacent stages of said plurality of pipeline stages.

15. A synchronous pipeline segment as in claim 1, wherein each of said plurality of pipeline stages is a master slave stage.

16. A synchronous pipeline segment as in claim 1, wherein each of said plurality of pipeline stages is a pulsed mode stage.

17. An integrated circuit (IC) including a plurality of logic paths, at least one of said plurality of logic paths including a synchronous pipeline segment, said synchronous pipeline segment comprising:
an input stage, said input stage being normally opaque;
an output stage, said output stage being normally opaque;
at least one intermediate stage, said at least one intermediate stage being normally transparent;
a plurality of place holder latches, each place holder latch receiving a data edge indicator indicating whether valid data is being provided to a corresponding stage and indicating whether valid stage data is in said corresponding stage; and
a local clock buffer providing a local clock selectively gating each said corresponding stage responsive to a global clock, said input stage and said output stage being selectively gated transparent and each said at least one intermediate stage being selectively gated opaque, data items passing locally asynchronously through each said at least one intermediate stage.

18. An IC as in claim 17, wherein said at least one intermediate stage is a plurality of intermediate stages, data items traversing said synchronous pipeline segment being separated by opaque gated ones of said plurality of intermediate stages.

19. An IC as in claim 18, wherein said data edge indicator indicates edges of said data items traversing said synchronous pipeline segment.

20. An IC as in claim 19, wherein each said local clock buffer gating each of said plurality of intermediate stages receives a plurality of said data edge indicators, provided to one or more of said plurality of place holder latches, each corresponding one of said plurality of intermediate stages being gated opaque responsive to an indication of valid data being provided to least two stages.

21. An IC as in claim 20, wherein each said input stage and each said output stage are gated transparent responsive to a valid data indication being provided to a corresponding said place holder latch.

22. An IC as in claim 21, wherein at least one said clock buffer receives one said data edge indicator being provided to a downstream said place holder latch.

23. An IC as in claim 21, wherein said plurality of intermediate stages is two intermediate stages and each said local clock satisfying the set of relationships described by gate$_{E0}$=NOT (valid$_{E-1}$), gate$_{T1}$=NOT (valid$_{E-1}$ AND valid$_{E0}$), gate$_{T2}$=NOT (valid$_{T1}$ AND (valid$_{E-1}$ OR valid$_{E0}$)) and gate$_{E3}$=Not (valid$_{T2}$), where the contents of each said corresponding place holder latch are designated E0, T1, T2 and E3, respectively, and said data edge indicator being provided to said place holder latch corresponding to said input stage is designated E−1.

24. An IC as in claim 17, wherein each of said plurality of pipeline stages is a master slave stage.

25. An IC as in claim 17, wherein each of said plurality of pipeline stages is a pulsed mode stage.

26. An IC as in claim 17, wherein said IC is a microprocessor.

27. A local clock block (LCB) for selectively gating normally transparent pipeline stages, said LCB comprising:
means for determining a gate transparent signal (gt) to a corresponding intermediate stage;
means for generating a gated transparent signal (gt_L2) for indicating whether said corresponding intermediate stage is currently transparent;
means for receiving a predictor signal (predictor) indicating the presence of an upstream data item in a pipeline segment;
a clock buffer receiving a global clock (global_clock); and
combining means for combining said gate transparent signal and said gated transparent signal with a said predictor signal, said clock buffer selectively providing one or more local clocks to said corresponding intermediate stage, said clock buffer holding said corresponding intermediate stage normally transparent and selectively gating said corresponding intermediate stage opaque responsive to said combining means.

28. A LCB as in claim 27, wherein said one or more local clocks being provided to at least one normally transparent pipeline stage further responsive to the relationship described by gate$_{T1}$=NOT (valid$_{E-1}$ AND valid$_{E0}$), where the contents of a corresponding place holder latch is designated T1 and a data edge indicator is provided to a place holder latch designated E0 and corresponding to an input stage is designated E-1.

29. A LCB as in claim 28, said LCD selectively gating normally transparent pipeline stages in a master slave pipeline clocked by said global clock (global_clock), said one or more local clocks being provided to said normally transparent pipeline stage further responsive to a set of relationships described by master_clock=NOT(NOT(global_clock) AND NOT (gt_L1)), and slave_clock=NOT(global_clock AND NOT(gt_L2)).

30. A LCB as in claim 28, said LCB selectively gating normally transparent pipeline stages in a pulsed pipeline clocked by said global clock (global_clock), said one or more local clocks being provided to said normally transparent pipeline stage further responsive to a set of relationships described by pulse_clock=NOT(NOT(NOT(global_clock) AND global_clock_DELAYED) AND NOT(gt_L1)).

31. A LCD as in claim 27, wherein said one or more local clocks are provided to at least one normally transparent pipeline stage further responsive to the relationship described by $$gate_{T2} = NOT\ (valid_{T1}\ AND\ (valid_{E-1}\ OR\ valid_{E0})),$$

where the contents of a corresponding place holder latch is designated T2, the contents of a corresponding place holder latch to an upstream stage is designated T1 and a data edge indicator being provided to an upstream place holder latch designated E0 and corresponding to an input stage is designated E-1.

32. A LCB as in claim 31, said LCB selectively gating normally transparent pipeline stages in a master slave pipeline clocked by said global clock (global_clock), said one or more local clocks being provided to said normally transparent pipeline stage further responsive to a set of relationships described by $$master\_clock = NOT(NOT(global\_clock)\ AND\ NOT\ (gt\_L1)),\ and$$

$$slave\_clock = NOT(global\_clock\ AND\ NOT(gt\_L2)).$$

33. A LCD as in claim 31, said LCB selectively gating normally transparent pipeline stages in a pulsed pipeline clocked by said global clock (global_clock), said one or more local clocks are provided to said normally transparent pipeline stage further responsive to a set of relationships described by $$pulse\_clock\ NOT(NOT(NOT(global\_clock)\ AND\ global\_clock\_DELAYED)\ AND\ NOT(gt\_L1)).$$

34. A LCB as in claim 27, wherein said one or more local clocks are further provided to said normally transparent pipeline stages further responsive to a set of relationships described by $$go[T_i] = NOT(valid[T_{i-1}])\ AND\ NOT(gt\_L2[T_i]),\ and$$

$$gt[T_i] = NOT(valid[T_{i-1}])\ AND\ gt\_L2[T_i]\ OR\ NOT\ (predictor[T_{i-1}]).$$

35. A LCB as in claim 34, said LCB selectively gating normally transparent pipeline stages, said one or more local clocks being further provided to said normally transparent pipeline stages further responsive to a set of relationships described by $$predictor[T_i] = predictor[T_{i-1}]\ AND\ gt\_L2[T_i]\ OR\ valid[T_{i-1}].$$

36. A LCB as in claim 35, said LCB selectively gating normally transparent pipeline stages in a master slave pipeline clocked by said global clock (global_clock), said LCB supporting both transparent mode and opaque mode in said normally transparent pipeline stage, said one or more local clocks being provided to said normally transparent pipeline stage further responsive to a set of relationships described by $$master\_clock = NOT(NOT(global\_clock)\ AND\ NOT\ (gt\_L_1)\ AND\ NOT(go\_L1)),\ and$$

$$slave\_clock = NOT(global\_clock\ AND\ NOT(gt\_L2))\ AND\ NOT(go\_L1).$$

37. A LCB as in claim 35, said LCB selectively gating normally transparent pipeline stages in a master slave pipeline clocked by said global clock (global_clock), said LCB supporting both transparent mode and opaque mode in said normally transparent pipeline stage, said one or more local clocks being provided to said normally transparent pipeline stage further responsive to a set of relationships described by $$master\_clock = NOT(NOT(global\_clock)\ AND\ NOT\ (gt\_L1)\ AND\ NOT(go\_L1)),\ and$$

$$slave\_clock = NOT(global\_clock\ AND\ NOT(gt\_L2))\ AND\ NOT(go\_L1\ AND\ NOT(gt\_L2)).$$

* * * * *